United States Patent [19]

Kostka

[11] 4,260,521
[45] Apr. 7, 1981

[54] METAL CATALYST WITHOUT CARRIER FOR THE PARTIAL SOOT-FREE OXIDATION OF LIQUID HYDROCARBONS WITH AIR

[75] Inventor: Hana Kostka, Nuremberg, Fed. Rep. of Germany

[73] Assignee: Siemens Aktiengesellschaft, Berlin and Munich, Fed. Rep. of Germany

[21] Appl. No.: 67,898

[22] Filed: Aug. 20, 1979

[30] Foreign Application Priority Data

Aug. 30, 1978 [DE] Fed. Rep. of Germany ....... 2837850

[51] Int. Cl.$^3$ .................. B01J 21/04; B01J 21/06; B01J 27/22
[52] U.S. Cl. ................. 252/443; 252/455 R
[58] Field of Search ........................ 252/443, 455 R

[56] References Cited
U.S. PATENT DOCUMENTS 3,180,840  4/1965  Shotts ................... 252/443
4,073,866  2/1978  Yamaki et al. ........... 252/443 X Primary Examiner—W. J. Shine
Attorney, Agent, or Firm—Kenyon & Kenyon

[57] ABSTRACT

For the soot-free production of a fuel gas mixture containing carbon monoxide, hydrogen and gaseous hydrocarbons by partial oxidation of liquid hydrocarbons with air, with air numbers below 0.3 and temperatures between 600° and 800° C., a metal catalyst is employed according to the invention, which is prepared by forming shaped bodies composed of an aluminum alloy which contains 15 to 35 wt. % silicon, and subjecting the shaped bodies for at least 10 hours at temperatures between about 600° and about 800° C. to an oxidizing atmosphere and for at least 10 hours at temperatures between about 600° and about 800° C. to gaseous or gasified hydrocarbons for the partial conversion of the aluminum in the shaped body to $\alpha$-$Al_2O_3$ and for the partial conversion of the silicon in the shaped body to $\beta$-SiC, respectively.

7 Claims, 8 Drawing Figures

METAL CATALYST WITHOUT CARRIER FOR THE PARTIAL SOOT-FREE OXIDATION OF LIQUID HYDROCARBONS WITH AIR

BACKGROUND OF THE INVENTION

1. Field of the Invention

The invention relates to a metal catalyst without a carrier for the soot-free production of a fuel gas mixture containing carbon monoxide, hydrogen and gaseous hydrocarbons by partial oxidation of liquid hydrocarbons with air, with air numbers below 0.3 and temperatures between 600° and 800° C.

2. Discussion of the Prior Art

It has been known for a long time that metal bodies of platinum having a large surface can be used as catalysts for various reactions. For example, U.S. Pat. No. 3,828,736, discloses a process in which a porous body of platinum or nickel such as nickel sponge is heated to an elevated temperature, and the heated catalyst is reacted with a mixture of liquid hydrocarbons and an oxygen-containing gas such as air, exhaust gas or an air/exhaust gas mixture. This process produces a gas mixture which contains hydrogen, carbon monoxide, methane and certain admixtures of low molecular weight hydrocarbons having up to four carbon atoms per molecule. This gas mixture is mixed with more air and burned in an internal-combustion engine connected thereto.

A device for the decomposition of liquid fuels into a propellent in which liquid fuel such as hydrazine or a hydrocarbon, possibly mixed with air, is conducted over a heated porous body of metal foam, is also known.

The gas mixtures generated in these reactions can be used advantageously for the operation of combustion devices such as internal-combustion engines or burners. These gas mixtures are also suitable for generating hydrogen or gas mixtures of a given composition, for example, reducing gases for various technical applications such as metallurgical processes.

The metal catalyst normally employed in these known procedures is either nickel or platinum. However, these known procedures suffer from a number of disadvantages which are related to the catalyst system. For example it is not practical to use platinum catalysts in large scale operations because of their high price. Nickel or nickel-containing metal alloys are not satisfactory because they tend to form soot in the partial oxidation of hydrocarbons under heavy air deficiency. It is known that in gas mixtures which have been generated by oxidation of hydrocarbons with air and low air numbers, part of the carbon is present in the form of soot. The air number is understood to be the ratio of the amount of air actually used to the amount of air which is required for the stoichiometric combustion of the hydrocarbon used. With air numbers below about 0.3, soot is always produced in a reaction which leads up to the thermodynamic equilibrium. Soot precipitation, however, not only leads to disturbances in the operation if the gas mixture produced is used in internal-combustion engines or burners, but the catalysts themselves are contaminated by the soot and their activity is reduced. Therefore, there is a need for a catalyst which furnishes a soot-free gas product with air numbers between about 0.07 and about 0.25. In addition, there is a need for a catalyst which is not deactivated by impurities such as sulfur in the hydrocarbons used.

A large number of catalysts are known in which metals, usually in the form of metal oxides, are applied as active components on a ceramic carrier. These ceramic carriers usually contain aluminum oxide which may be present in different forms. The thermally unstable forms of the $Al_2O_3$ are distinguished by the fact that they themselves already have many active centers due to their crystal structure so that these forms are themselves already catalytically active and, therefore, can effectively aid the activity of the other catalytic components. However, there is a drawback to the use of these carriers because at the operating temperatures of the process these forms of $Al_2O_3$ are transformed into $\alpha$-$Al_2O_3$ which has no appreciable activity. Such catalysts with $Al_2O_3$—containing carriers are, therefore, temperature-sensitive. An additional drawback to the use of such carriers, is that there exists the possibility that the activity of such catalysts will be destroyed if they are subjected to high process temperatures in the presence of excess air, such as in the case of air break-ins, or when the catalyst is shut down.

The carriers of such catalysts must exhibit a highly porous structure in order to provide a sufficiently large surface area. The porous structure results in another drawback because it results in a reduction of thermal conductivity. Good conductivity is advantageous in conducting the process in a safe and reliable manner. Such catalysts also tend to form soot if the fuel is in a liquid form when it strikes the hot catalyst. Therefore, when using the known catalyst having a conventional carrier the liquid fuel must be carefully evaporated or atomized prior to use. This results in an increase in the time and effort required to carry out these processes.

It is therefore an object of this invention to provide a metal catalyst without a carrier for the partial oxidation of liquid hydrocarbons.

It is also an object of this invention to provide a metal catalyst which has high thermal conductivity, and which is extremely stable to thermal and mechanical degradation.

It is still another object of this invention to provide a metal catalyst which maintains a high level of activity over long periods of operation.

It is yet another object of this invention to provide a metal catalyst which is largely insensitive to impurities normally found in hydrocarbon such as sulfur or metals, and which is largely insensitive to air break-ins and contact with liquid fuels.

Still other objects and advantages of the present invention will be obvious and apparent to those of skill in the art from the specification and the appended claims.

SUMMARY OF THE INVENTION

These and other objects which are apparent to those of skill in the art from a consideration of the specification and appended claims are achieved by the metal catalyst of the present invention. This invention provides a metal catalyst without a carrier, the metal catalyst prepared by the steps of:

forming one or more shaped bodies comprising an aluminum alloy containing from about 15 to about 35 weight percent silicon based on the total weight of the alloy; and subjecting said shaped bodies to a temperature of from about 600° to about 800° C. for at least 10 hours in the presence of an oxidizing atmosphere and in the presence of gaseous hydrocarbons.

In the solid state, aluminum and silicon are soluble in each other only to a limited extent. The solubility of silicon in aluminum at room temperature is less than 0.5 wt %, so that at a high silicon content an aluminum phase is present beside a Silicone phase. With a silicon content of about 11.7 wt. %, the two phases form a eutectic having a melting point of 577° C., which is present as a fine dispersion of the two phases in each other (coarse crystalline mixture).

In the practice of this invention, one begins with an aluminum alloy having an over-eutectic silicon content. A polished section through such a metal body then shows basic matter of the Al-Si eutectic in which is embedded in the form of needles or beams in a primary phase of silicon. Such Al-Si alloys are known materials, as for example housings of reciprocating engines, which are described in more detail in German "Auslegeschrift" No. 23 45 127 at col. 1, lines 4 and 16. Depending on the purity of such commercially available materials, traces of impurities such as Fe, Ti, V, Ni or Mn may be finely distributed in the material. These impurities can be distributed so finely that they can be detected chemically only as traces, but they may also be detectable as isolated occlusions, for example, as $Al_9Fe_2Si_2$. In general, however, the impurity content of commercially available materials is less than 1 wt. %, and at most 3 wt. %.

The catalytic shaped bodies can be made from a commercially available alloy which consists of such an Al-Si eutectic with a Si primary phase. This can be done, for instance, by communicating a casting of the aluminum alloy. However, the alloy particles of this alloy can also be mixed with lubricants and be pressed into the desired form, for instance, into pellets.

The shaped bodies are subjected at 600° to 800° C., on the one hand, to an oxidizing atmosphere, and on the other hand to gaseous hydrocarbons. While this can be done in principle in separate steps, a common heat treatment is, preferably performed, in a gas stream which consists of hydrocarbons and air. Most simply, a gas stream is used such as is generated in the reaction to be catalyzed. The ratio of hydrocarbons to air in the stream is preferably selected such that the ratio of carbon atoms to molecules of oxygen gas in from about 2 to about 8. In the particularly preferred embodiments of this invention, the ratio of carbon atoms to molecules of oxygen gas is from about 4 to about 6.5.

The present invention thus comprises a metal catalyst, without a carrier, for the soot-free generation of a fuel gas mixture containing carbon monoxide, hydrogen and gaseous hydrocarbons by the partial oxidation of liqiud hydrocarbons with air, with air numbers below 0.3 and at temperatures of from about 600° C. to about 800° C., wherein the metal catalyst is prepared by the steps of:

forming shaped bodies composed of an aluminium alloy having from about 15 to about 35 wt. % silicon based on the total weight of the alloy, and subjecting the shaped bodies to a heat treatment for at least 10 hours at a temperature of from about 600° C. to about 800° C. in the presence of an oxidizing atmosphere for the partial conversion of the aluminum into $\alpha$-$Al_2O_3$, and for at least 10 hours at a temperature of from about 600° C. to about 800° C. in the presence of gaseous hydrocarbons for the partial conversion of the silicon into $\beta$-SiC.

According to a particular embodiment of this invention, the silicon content of the aluminum alloy is from about 20 to about 25 weight percent based on the total weight of the alloy. According to a further embodiment, the heat treatment of the shaped bodies is such that from about 5 to about 30 weight percent of the aluminum therein is converted into $\alpha$-$Al_2O_3$ and from about 1 to about 10 weight percent of the silicon therein is converted to $\beta$-SiC.

BRIEF DESCRIPTION OF THE DRAWINGS

The preferred embodiments of this invention, and the preferred uses thereof, will be described in greater detail in conjunction with the accompanying diagrammatic representations. It should be understood that the means of carrying out the preferred embodiments exemplified by the figures are not limiting, but rather illustrative and representative of many other embodiments and uses which fall within the spirit of the invention, and that various modifications of the following constructive and operational detail apparent to a person of skill in the art, are within the scope of this invention.

DESCRIPTION OF THE PREFERRED EMBODIMENTS

Figure 1:
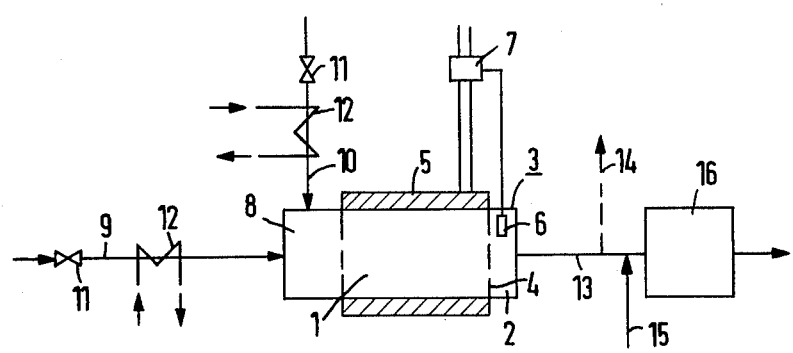
FIG. 1 is a schematic diagram of a device for reacting liquid hydrocarbons with air, and for operating a combustion device with the fuel gas produced.

Referring to FIG. 1, the metal bodies 1 of the catalyst of this invention for converting the hydrocarbons are arranged in the reaction chamber 2 of a gas generator 3. For example, bodies 1 can be in the form of a bed which is held together by perforated plates 4. The gas generator 3 used here for test purposes, has relatively large and thick walls and a small bed volume and, therefore, has heat losses so high that the reaction temperature necessary for conversion can only be maintained by external heating of the reaction chamber 2. This external heating is provided by heating jacket 5 which in this embodiment is heated electrically by means of a control device 7 which is controlled by a temperature sensor 6 arranged in the reaction chamber 2. The entrance of the reaction chamber 2 is preceded by a mixing chamber 8 into which feed lines 9 and 10 for hydrocarbon and air pass. These feed lines 9 and 10 contain metering valves 11 for adjusting the hydrocarbon throughput and the air numbers. Feed lines 9 and 10 also include heating devices 12, for instance, heat exchangers, for preheating the reaction gases. The fuel gas produced can be taken an analyzed from the outlet line 13 of the gas generator 3 either via a test line 14, or the fuel gas is mixed with combustion air introduced by way of secondary air, line 15 and the resultant mixture taken to combustion device 16. In this embodiment, the combustion device serves as a domestic burner. However, it should be appreciated that the combustion device can be an internal combustion engine, for instance, a motor vehicle engine or a gas turbine.

To produce the metal bodies 1, a commercially available casting of an aluminum silicon alloy is broken into fragments of about 5 mm diameter. The starting material designated by the manufacturer as "aluminum silicide" exhibits in the analysis, besides aluminum, 22% by weight of silicon, 0.1% by weight of titanium, 0.1% by weight of vanadium and 0.1% by weight of nickel. Aluminum and silicon are present as a eutectic with Si as the primary phase, as far as can be determined by the analysis. For the aluminum, the lattice constant was determined within the error limits as the lattice constant of pure aluminum. Only a very small Si-content is therefore dissolved in the Al phase. Such an alloy is obtained, for instance, by slow cooling of a melt of the two components. The pore volume of the fragments was 0.05 to 0.15 ml/g; pores from a diameter of 8 nm on where included. The mean pore radius was 10 nm and the surface 0.1 m$^2$/g.

From the same starting material, fragments of different Si contents and exhibiting other porosities were produced, for example, by dissolving part of the aluminum from the structure. Also, an alloy powder was made by milling the fragments. The fragments were mixed with 2 weight percent graphite as a plasticizing lubricant and cold pressed in tabletting press at a pressure of 750 kg/cm$^2$. Such pellets have a considerably higher porosity but exhibit substantially the same catalytic behavior as the first-mentioned fragments to which the results described in the following refer.

A mixture of heating oil and air is introduced over the first mentioned fragments in the reactor. For a long-term test, heating oil "extra light", density 0.85, C-content 85.7 weight %, was used. However, medium or heavier heating oil having a density of 0.92 or 0.98, and a carbon content of 85.3 and 84.9 weight %, respectively, can also be used. Such medium or heavier heating oil can be used for operating a burner. Also, cracking of unleaded "straight run" gasoline was carrried out successfully in the operation of an internal combustion engine connected thereto.

The heating oil was pre-heated to about 415° C., and the air number of the mixture was set to 0.09±0.01. The loading of the reactor charge was 12 liters of heating oil per liter of bed volume per hour.

Figure 2:
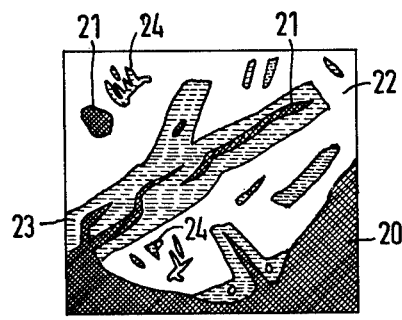
FIG. 2 is a micro-polished section of an Al-Si shaped body perpendicular to the edge of the Al-Si shaped body, before the shaped body is subjected to a hydrocarbon/air gas stream.
Figure 3:
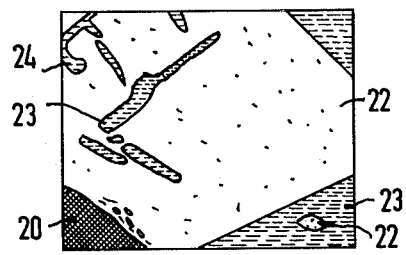
FIG. 3 is an enlarged section of FIG. 2.

Before the reactor was started up for the first time, a sample of the metal bodies was taken and examined by X-rays, analytically and in the micro by means of the microprobe and a light microscope. FIGS. 2 and 3 shows the findings of the light microscope.

From FIGS. 2 and 3, it is apparent that in front of the dark background 20, isolated cracks and pores 21 can be seen. The main mass consists of the bright phase 22 of the largely aluminum-containing eutectic. Embedded therein are needle or beam-shaped crystals 23 which are the primary phase of the silicon. FIGS. 2 and 3 also show as an impurity, a light-gray iron phase 24, the composition of which corresponds approximately to the intermetallic body compound Al$_9$Fe$_2$Si$_2$ and which also contains small amounts of Mn and Ni. The Mn and Ni impurities, were also determined analytically in extremely small amounts in the other zones of the material.

Figure 4:
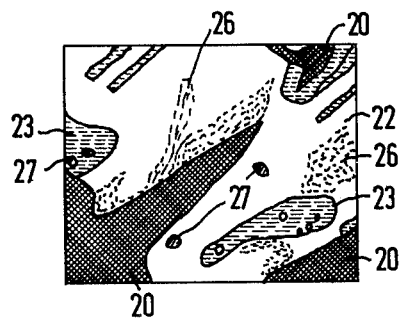
FIG. 4 is an embodiment similar to FIG. 2 after the shaped body was exposed to the hydrocarbon/air gas stream.

After 12 hours in the reactor, another sample of the metal bodies was taken and analyzed in the aforementioned manner, by light microscrope. FIG. 4 indicates the findings. FIG. 4 shows a distinctly bright, largely aluminum-containing phase 22, and the embedded, gray Si-phase 23. In addition, very fine-grained zones 26 are observed which contain oxygen. In turns out that this is a very fine-grained Al$_2$O$_3$ phase with occlusions of different components, mainly aluminum and silicon. Particularly in the outer zones of the particles, medium-gray small precipitates 27 were also observed which were identified as SiC. The catalyst is now formed for long-term operation.

Further investigations after 200 to 2000 operating hours show that with increasing operating periods, during which the activity of the catalyst no longer changes appreciably, the formation of Al$_2$O$_3$-containing zones is gradually increased. The structure of these zones is very inhomogeneous. The Al$_2$O$_3$ is partially present in nearly pure alpha-form. Frequently it is permeated by different structure components in extremely fine distribution. Si and SiC containing as well as heavily Al-containing structure components occur. In addition, also the heavily Al-containing eutectic particles are surrounded by a dark-gray Al$_2$O$_3$-containing layer. In between, there are particles which consist predominately of Si and contain dark-gray Al$_2$O$_3$ precipitates as well as medium-gray $\beta$-SiC precipitates. Agglomerations of these precipitates occur particularly in the outer zones of the particles and along the cracks and pores. With increasing operating time, the size of the SiC precipitates seems to grow very slowly. It was further determined that small amounts of sulfur are accumulated in the pores within an oxidic outer zone as well as in the pores in the interior of the particles.

In principle the same results were obtained also when n-heptane and diesel oils were used.

Several times, excess air got into the reaction chamber due to a disturbance in the operation. Although an air break-in is accompanied by temperatures which are considerably above the melting point of the eutectic, it was surprising that for all practical purposes no sintering-together or other changes of the catalyst structure were observed. Only slightly rounded zones due to melting and solidification were found at the surface. Apparently the Al$_2$O$_3$ and SiC formed give increased structural stability to the metal bodies, like a highly heat-resistant matrix.

Figure 5:
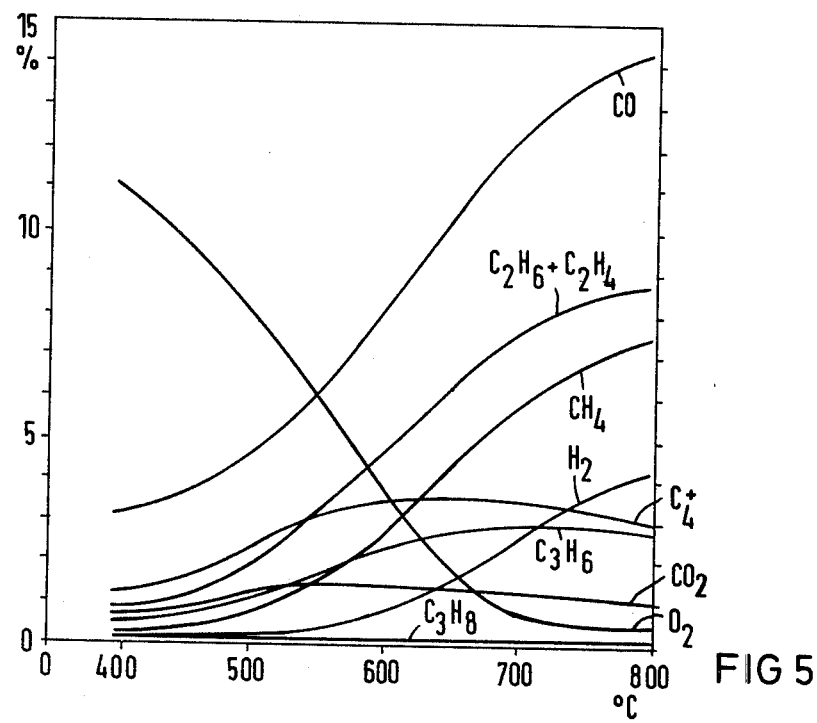
FIG. 5 is a graph of the composition of the fuel gas produced as a function of the reaction temmperature.

In FIG. 5, the gas composition is given as a function of the reaction temperature if heating oil "extra light" is reacted in the reaction chamber with a loading of 12 liters per liter of bed volume per hour and with air numbers around 0.09. The gas contents are given in volume %, based on the gas volume produced, (excluding condensable, unreacted hydro-carbon residues). The remainder is nitrogen.

An increasing percentage of the oxygen of the added air is used up in forming carbon monoxide, and the conversion increases with increasing reaction temperature. Only a small amount of CO$_2$ is produced. In addition to hydrogen, methane as well as C$_2$ and C$_3$-containing hydrocarbons are generated. A component designated with C$_4$+ which is not differentiated with respect to its hydrogen content was also generated. It is worthy of note that no generation of acetylene was observed which is unstable at these temperatures and would decompose, forming soot.

Figure 6:
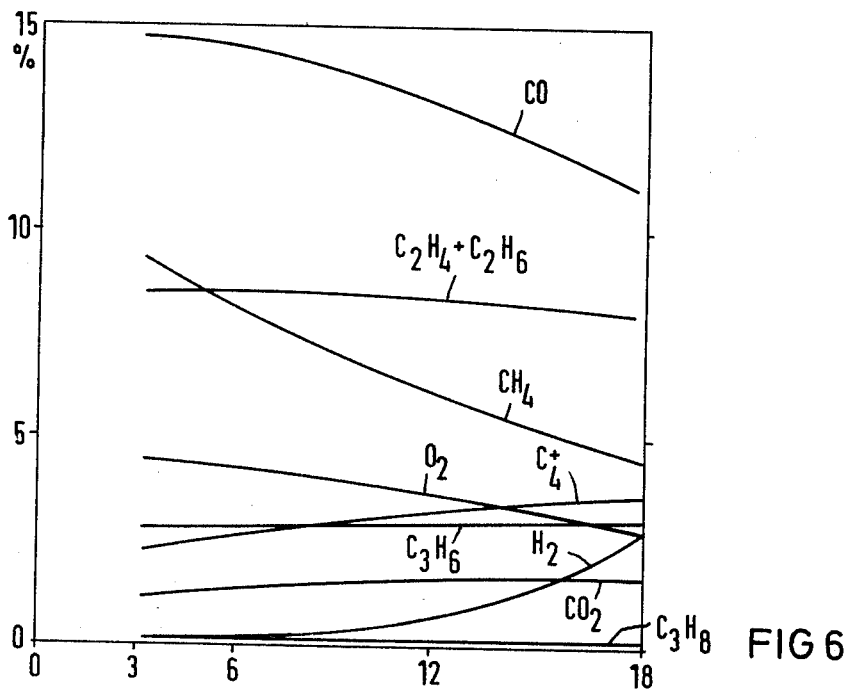
FIG. 6 is a graph of the composition of the fuel gas produced as a function of the loading of the catalyst.

In FIG. 6, the gas composition is given as a function of through-put. The reaction temperature was maintained at a constant 750° C. and various catalyst loadings are set. FIG. 6 shows that the rate of conversion decreases with increasing through-put. This can be recognized from the decrease of the CO-content and the increase of nonspent oxygen in the gas mixture produced. In this gas mixture part of the liquid hydrocarbons present is in the form of fuel which is not reacted or only partially reacted, and is merely evaporated, yet it is still suited for most applications at such high catalyst loadings as 18 liter/1 hr.

Figure 7:
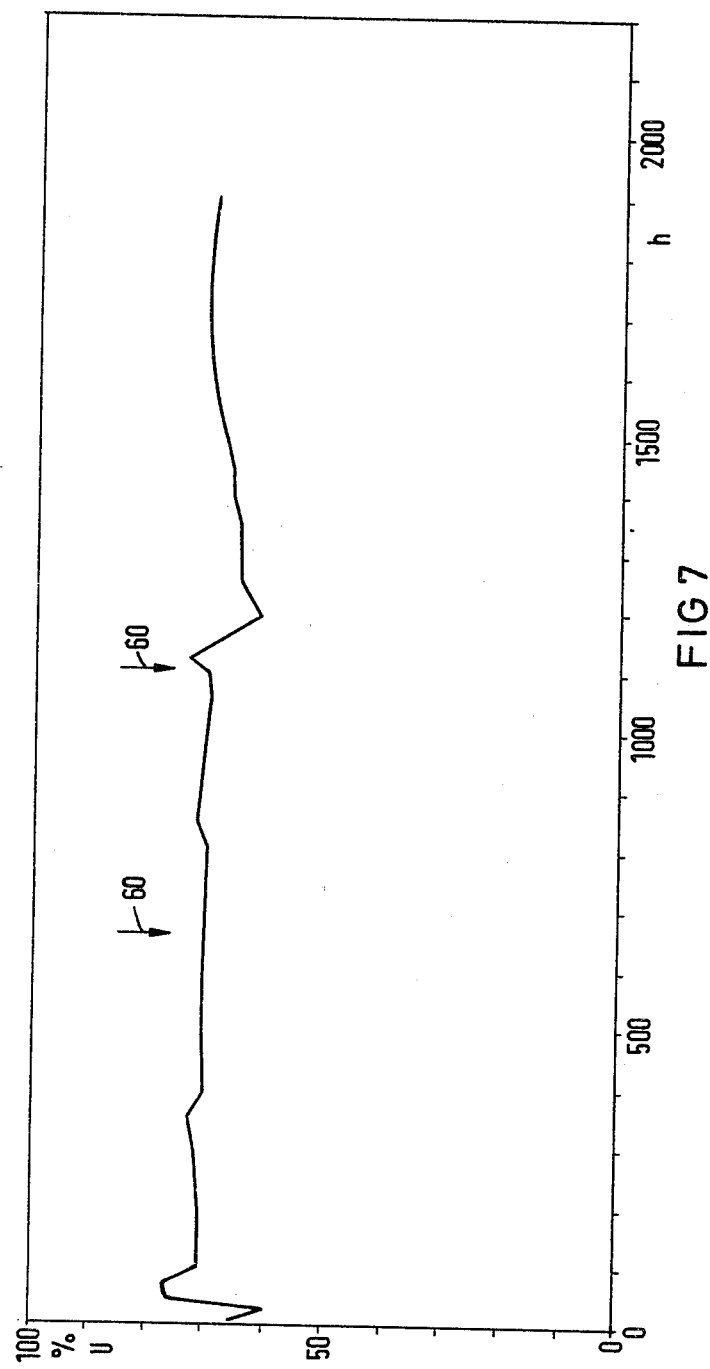
FIG. 7 is a graph showing the conversion obtained as a function of the operating time for long-time operation.

In FIG. 7, the percentage of the liquid fuel which was converted into low molecular weight hydro-carbons, which are gaseous under normal conditions, is shown as a function of the operating hours. The air number was approximately 0.09, the catalyst load 12 1/1 hr. and the catalyst temperature 750° C. First, the untreated metal bodies, not subjected to a hydrocarbon air stream, were put into the reactor. After the first 12 operating hours, the catalyst has been formed into the structure shown in FIG. 4. After initial fluctuations, a conversion degree of about 70% is obtained. The aforementioned air break-ins into the catalyst are designated by the arrows 60. In the first air break-in, the degree of conversion remains practically constant. After the second air break-in, a temporary decrease to about 60% is apparent which, however, is followed by a slow rise to the previous value. These curves contain innumerable on and off switching actions of the installation. For switching off, no particular measures had to be taken to protect the catalyst while it was cooling off slowly, from inflowing air. Starting-up the reaction charge was accomplished by electrically evaporating the heating oil and heating it to a maximum of 415° C. This was accomplished by switching on the external heater of the reactor and additionally pre-heating the evaporating air electrically to 560° C. After at most 8 minutes, it was possible to turn off the heating of the evaporating air, since the heating power of the external reactor heating was sufficient to maintain a stable reaction temperature of 750° C. This relatively long starting time can be shortened for instance, by increasing the air number and carrying out in the reactor more exothermic reactions with correspondingly higher heats of reaction. In order to test the suitability of Al-Si metal bodies for the conversion at small air numbers, such additional measures were dispensed with.

Figure 8:
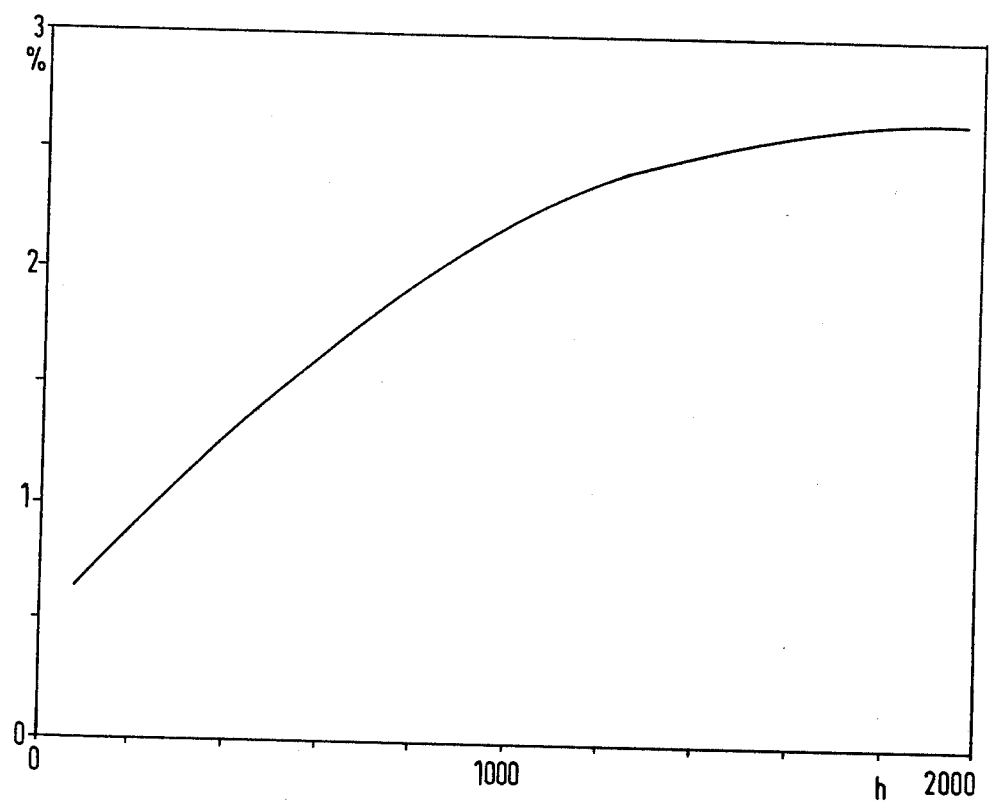
FIG. 8 is a graph showing the deposited quantity of soot as a function of the operating time for long-time operation.

As was already mentioned, the formation of small amounts of soot at the catalyst can be shown. FIG. 8 shows the amount of soot deposited at the catalyst in weight % based on the weight of the metal bodies prior to use. As can be seen from FIG. 8, even after 2000 operating hours, the soot formation was less than 3%. The soot is not visible, but presumably deposited in the pores. Parallel with the soot formation, a slight absorption of sulfur in the pores of the metal bodies was observed. However, neither soot nor sulfur impaired the activity of the catalyst. The catalyst can be used with fuels having a higher sulfur content. No formation of $SO_3$ or other detrimental sulfur oxides occurred in the fuel gas or in the exhaust gas of the combustion device fed with the fuel gas.

What is claimed is:

1. A metal catalyst without a carrier for the soot-free generation of a fuel gas mixture containing carbon monoxide, hydrogen and gaseous hydrocarbons by the partial oxidation of liquid hydrocarbons with air, with air numbers below 0.3 and at temperatures of from about 600° to about 800° C., wherein said metal catalyst is prepared by the steps comprising:

forming shaped bodies composed of an aluminum alloy having from about 15 to about 35 wt. % silicon based on the total weight of the alloy, subjecting said shaped bodies to a heat treatment for at least 10 hours at a temperature of from about 600° to about 800° C. in the presence of an oxidizing atmosphere for the partial conversion of the aluminum into $\alpha\text{-}Al_2O_3$, and for at least 10 hours at a temperature of from about 600° to about 800° C. in the presence of gaseous hydrocarbons for the partial conversion of the silicon into $\beta$-SiC.

2. A metal catalyst according to claim 1, wherein said heat treatment is performed for at least 10 hours in a gas stream of hydrocarbons and air wherein the ratio of carbon atoms in said hydrocarbon to the molecules of oxygen in the air is from about 2 to about 8.

3. A metal catalyst according to claim 2, wherein the ratio of carbon atoms in said hydrocarbon to the molecules of oxygen in said air is from about 4 to about 6.5.

4. Metal catalyst according to one of the claims 1, 2 or 3 wherein the silicon content of said aluminum alloy is from about 20 to about 25 weight percent.

5. A metal catalyst according to one of the claims 1, 2, 3 or 4 wherein said shaped bodies are formed by mixing an alloy powder of the aluminum alloy with lubricants, and molding the resultant mixture.

6. A metal catalyst according to one of claims 1, 2, 3 or 4 wherein from about 5 to about 30 weight percent of said aluminum in said shaped bodies is converted into $\alpha\text{-}Al_2O_3$ and from about 1 to about 10 weight percent of said silicon in said shaped bodies is converted to $\beta$-SiC.

7. The metal catalyst according to claim 1 wherein said air number is from about 0.07 to about 0.25.

* * * * *

UNITED STATES PATENT AND TRADEMARK OFFICE
CERTIFICATE OF CORRECTION

PATENT NO. : 4,260,521
DATED : April 7, 1981
INVENTOR(S) : Hana Kostka

It is certified that error appears in the above—identified patent and that said Letters Patent is hereby corrected as shown below:

In the drawings, sheet 2, FIG. 6, the reference to "$H_2$" should read --$O_2$-- and the reference to "$O_2$" should read --$H_2$--.

Signed and Sealed this

Sixteenth Day of March 1982

[SEAL]

Attest:

GERALD J. MOSSINGHOFF

*Attesting Officer*     *Commissioner of Patents and Trademarks*